Aug. 17, 1948. P. E. MARSHALL 2,447,417
APPARATUS FOR TREATING FOODS
Filed March 19, 1945

INVENTOR.
PRESTON E. MARSHALL
BY
ATTORNEYS

Patented Aug. 17, 1948

2,447,417

UNITED STATES PATENT OFFICE 2,447,417

APPARATUS FOR TREATING FOODS

Preston E. Marshall, Wayne, Mich.

Application March 19, 1945, Serial No. 583,451

2 Claims. (Cl. 99—258)

This invention relates to apparatus for treating foods to prevent oxidation and spoilage thereof.

One of the principal objects of this invention is to provide improved apparatus for introducing an inert gas in the food to be treated prior to compressing the latter. In accordance with this invention, the food to be treated is inserted in a suitable press and the required quantity of inert gas is injected into the food prior to compressing the food by the platen of the press. The minute spaces or voids in the compressed cake or block of food are thereby filled with the inert gas, instead of air and, as a result, oxidation of the food is prevented or sufficiently checked to enable storing the food for an appreciable length of time without spoilage.

The above as well as other objects will be made more apparent as this description proceeds, especially when considered in connection with the accompanying drawing, wherein.

Figure 1:
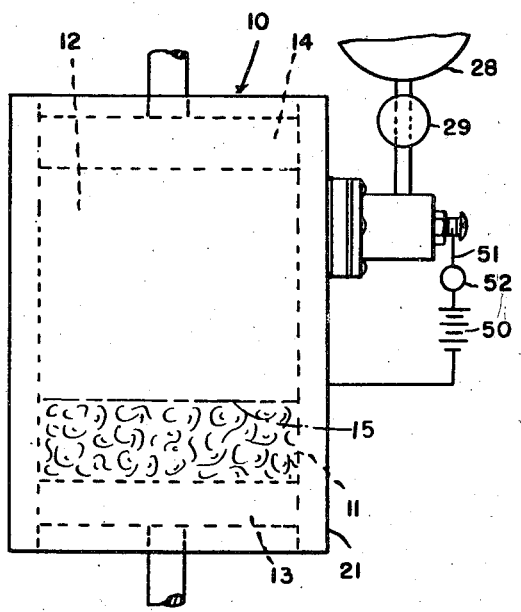
Figure 1 is a diagrammatic view of a food press showing an injector of the type forming the subject matter of this invention in assembled relation therewith.

Referring now more in detail to the drawing, it will be noted that Figure 1 illustrates a press 10 having a vertical chamber 11 adapted to contain a quantity of food 12 and having the lower end closed by an ejector punch 13. A punch or platen 14 is supported above the chamber 11 for movement by any suitable mechanism (not shown) into the chamber 11 through the upper end of the latter. As the platen 14 moves downwardly in the chamber 11, the food 12 is compressed in the chamber against the top surface of the ejector punch 13 to form a cake or block of compressed food indicated generally in Figure 1 by the reference character 15. After the food is compressed and the platen 14 is raised out of the chamber 11, the ejector punch 13 is moved upwardly by any suitable mechanism (not shown) to discharge the compressed block of food through the upper end of the chamber. The block or cake 15 of compressed food may then be wrapped or otherwise packaged for shipment.

In order to enable storage of the compressed food for an appreciable length of time without the danger of spoilage of the food, provision is made herein for introducing into the chamber 11 a gaseous medium characterized in that it greatly retards or delays oxidation of the food. Particularly satisfactory results have been obtained by dispersing an inert gas such, for example, as carbon dioxide, nitrogen or gases having similar inactive characteristics. In actual practice the gas is introduced into the chamber 11 before the food 12 is compressed in the latter. As a result the gas particles are locked into the compressed cake or block of food 15 and serve to fill any voids in this block. Inasmuch as oxygen molecules do not readily attach themselves to the particles of the gaseous medium dispersed in the food, it follows that oxidation of the food is prevented or at least greatly retarded so that the food may be stored for long periods of time without danger of spoilage.

Figure 3:
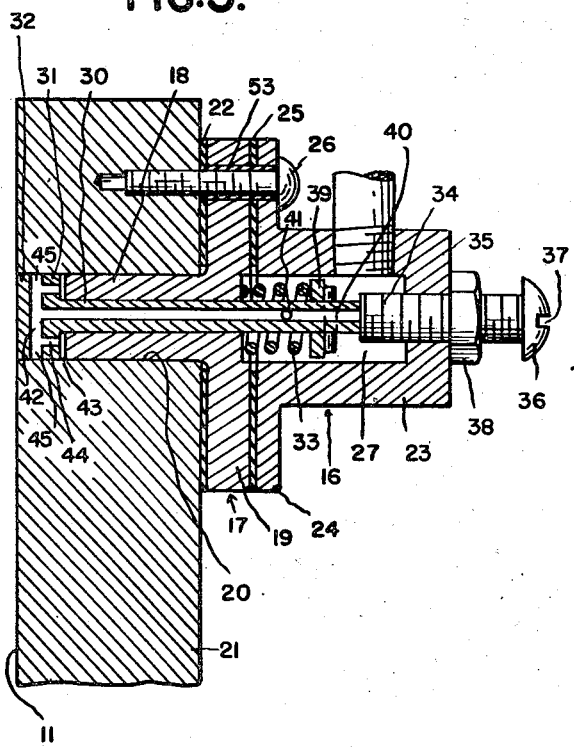
Figure 3 is a sectional view taken on the line 3—3 of Figure 2.
Figure 2:
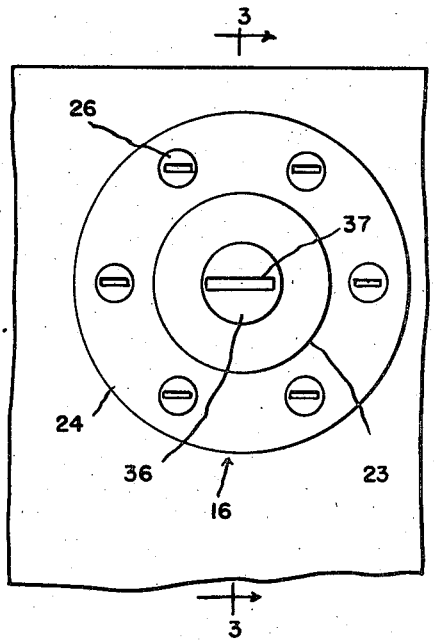
Figure 2 is an end elevation of the injectors.

As shown particularly in Figure 3 of the drawing, the inert gaseous medium is introduced into the chamber 11 by an ejector 16. The injector 16 shown in Figure 3 of the drawing comprises a body 17 having an axially bored cylindrical portion 18 and having a radial flange 19 at the rear end of the portion 18. The cylindrical portion 18 is sleeved in a bore or opening 20 formed in the side wall 21 of the chamber 11 and an annular gasket 22 is positioned between the outer surface of the wall 21 and the adjacent side of the radial flange 19.

A cylindrical cap 23 is positioned at the rear side of the body 17 and is provided with a radial flange 24. In the assembled relationship of the parts, the flange 24 assumes a position adjacent the radial flange 19 and an annular sealing gasket 25 is positioned between the flanges. The radial flanges are clamped together and to the side wall 21 of the chamber 11 by means of a plurality of circumferentially spaced screws 26.

The cap 23 is provided with a compartment 27 in alignment with the bore through the cylindrical portion 18 of the body 17 and this compartment communicates with a source 28 of inert gas under pressure through the medium of a valve 29. The valve 29 is operated by any suitable means (not shown) to periodically discharge a quantity of insert gas under pressure into the compartment 27. The flow of gas from the compartment 27 to the interior of the chamber 11 is controlled by a plunger 30 supported for sliding movement in the bore formed in the cylindrical portion 18 of the body 17 and having a head 31 which occupies a position in the bore 20 in advance of the cylindrical portion 18. The front face 32 of the head 31 on the plunger 30 is normally maintained flush with the inner surface of the wall 21 by a spring 33 and an adjustable stop 34.

The adjustable stop 34 is in the form of a screw which is threaded in the end wall 35 of the cap 23 and the forward end of the screw projects into the compartment 27 to provide an abutment for the adjacent end of the plunger 30. The rear end of the screw is formed with a head 36 slotted as at 37 to enable manipulation of the screw and is normally held in any one of its various adjusted positions by means of a lock nut 38. The spring 33 surrounds the end of the plunger 30 in the compartment 27 and the front end of the spring abuts the adjacent wall of the body 17. The rear end of the spring engages an abutment 39 which is secured to the plunger 30 and thereby maintains the outer end of the plunger in contact with the adjacent end of the adjustable screw 34. The screw 34 is adjusted to insure maintaining the head 31 of the plunger with its front face 32 flush with the inner surface of the wall 21 so that the plunger does not interfere with the movement of the platen 14 previously discussed.

The plunger 30 is formed with a longitudinal passage 40 which communicates with a compartment 27 through ports 41 and which also communicates with a transverse passage 42 extending through the head 31 of the plunger. As shown in Figure 3 the transverse passage 42 communicates with the space 43 formed by adjacent surfaces of the body portion 18 and head 31 of the plunger by means of passages 44.

Referring now to the operation of the injector 16, it is to be understood that the valve 29 is operated to supply a charge of inert gas under pressure to the compartment 27 before the platen 14 is moved downwardly in the chamber 11 to compress the food in the latter chamber. The inert gas discharged into the chamber 27 enters the passage 40 through the ports 41 and flows into the transverse passage 42. From the transverse passage 42 the inert gas under pressure flows into the space 43 through the passages 44 and acts on the head 31 of the plunger 30 to move the latter into the chamber 11. Movement of the head 31 of the plunger into the chamber 11 connects the passage 42 with the interior of the chamber through ports 45 which form extensions of opposite ends of the transverse passage 42. As a result, the inert gas is dispersed in the loose food material contained in the chamber 11 and the pressure in the space 43 is accordingly reduced. This reduction in pressure in the space 43 enables the spring 33 to return the plunger 30 to the position shown in Figure 3, wherein the face 32 on the head 31 of the plunger is flush with the inner surface of the wall 21. The platen 14 may then be lowered to compress the food material 12 with the inert gas to form the cake or block 15. After the platen 14 is raised and the compressed block 15 is ejected from the chamber 11, another supply of food material is introduced into the chamber through the upper end of the latter and the valve 29 is again operated in the same manner previously described to inject a charge of inert gas into the chamber.

If desired, means may be provided for indicating to the operator when the plunger 30 is withdrawn from the chamber 11 so that there will be no danger of operating the platen 14 while the head 31 of the plunger 30 is in the path of travel of the platen. This may be accomplished by employing an electric circuit 50 indicated in Figure 1 as having one side connected to the press 10 and as having the other side 51 connected to the adjustable screw or abutment 34. A visual signal in the form of a lamp 52 is connected in the side 51 of the circuit 50 so as to be illuminated when the circuit is closed. When using this electric signalling system, the annular gasket 22 is formed of a dielectric material so as to insulate the screw or abutment 34 from the wall 21 of the press. Also sleeves 53 of dielectric material are provided for the fastener elements 26 so that the latter will also be insulated from the cap 23 or screw 34. Thus the circuit 50 is closed by engagement of the plunger 30 with the adjustable abutment 34 and the lamp 52 is illuminated to indicate that the head 31 of the plunger is out of the compression chamber 11.

What I claim as my invention is:

1. Apparatus for treating foods comprising a chamber adapted to contain the food to be treated and having an opening in one wall, an injector having a body portion projecting into the opening and having a compartment adapted to periodically receive a quantity of inert gas under pressure, a plunger slidably supported in the body and having a head supported in the opening in advance of the adjacent end of the body portion, a longitudinal passage extending through the plunger and having one end communicating with the compartment, a transverse passage in the head for connecting the longitudinal passage to the space between the body portion and head, whereby the gas under pressure discharged into the space between the body and head of the plunger acts on said head to move the latter into the chamber, ports in the head for connecting the passages to the interior of the chamber, and spring means acting on the plunger for returning the latter upon a drop in the gas pressure in said compartment.

2. Apparatus for treating foods comprising a chamber adapted to contain the food to be treated, an injector having a compartment adapted to periodically receive quantities of inert gas under pressure and having a slidable plunger provided with a passage communicating with said compartment, a head on the plunger movable into the chamber in response to the pressure of the inert gas to connect the passage with the chamber and thereby inject the quantity of inert gas in the compartment into said chamber, spring means acting on the plunger for moving the head of the latter out of the chamber upon a drop in pressure in said compartment, and a signal operated by the plunger in its return movement to a position wherein the head is retracted from the chamber.

PRESTON E. MARSHALL.

REFERENCES CITED

The following references are of record in the file of this patent:

UNITED STATES PATENTS

| Number | Name | Date |
|---|---|---|
| 60,462 | Bartholomew | Dec. 18, 1866 |
| 966,514 | Baker | Aug. 9, 1910 |
| 982,671 | Hardy | Jan. 24, 1911 |
| 1,168,695 | Young | Jan. 18, 1916 |
| 1,591,932 | Young | July 7, 1926 |
| 1,671,118 | Mabee | May 29, 1928 |
| 2,096,581 | Goldberg | Oct. 19, 1937 |
| 2,107,891 | Gillen | Feb. 8, 1938 |
| 2,244,394 | Hautzenroeder | June 3, 1941 |